United States Patent [19]
Hureau et al.

[11] 3,947,174
[45] Mar. 30, 1976

[54] APPARATUS FOR REPRODUCING PERFORATED SEAMLESS TUBULAR FILMS BY MEANS OF COMPRESSED AIR

[76] Inventors: Jean-Claude Hureau, 56, rue du Leon, 78 310 Maurepas; Jacques Hureau, 18, rue de la Glaciere, 75 013 Paris, both of France

[22] Filed: Oct. 2, 1973

[21] Appl. No.: 402,827

[30] Foreign Application Priority Data
Oct. 20, 1972 France .............................. 72.37186

[52] U.S. Cl. ................. 425/72 R; 264/94; 425/290; 425/326 R; 425/380; 425/387 R; 425/467; 264/154
[51] Int. Cl.² ........................................ B29C 24/00
[58] Field of Search ...... 264/95, 209, 154; 425/290, 425/385, DIG. 37, DIG. 119, 291, 387 R, 388, 326 R, 298, 467, 380, 381, 466, 468, 325, 72

[56] References Cited
UNITED STATES PATENTS

| | | | |
|---|---|---|---|
| 2,834,983 | 5/1958 | Norton ..................... | 425/DIG. 37 X |
| 3,038,198 | 6/1962 | Schaar ........................... | 425/387 X |
| 3,372,920 | 3/1968 | Corbett et al ................... | 264/173 X |
| 3,841,815 | 10/1974 | Labarre .......................... | 425/325 X |

FOREIGN PATENTS OR APPLICATIONS

| 46-9672 | 3/1971 | Japan ................................ 425/467 |
|---|---|---|

*Primary Examiner*—R. Spencer Annear
*Assistant Examiner*—Mark Rosenbaum
*Attorney, Agent, or Firm*—Robert E. Burns; Emmanuel J. Lobato; Bruce L. Adams

[57] ABSTRACT

Apparatus is provided for preparing perforated seamless tubular films of preferably thermoplastic material by passing an extruded tubular film over a perforated wall of a chamber connected to a constant pressure compressed air source.

In the apparatus compressed air from the chamber is allowed to pass periodically out of a first series of openings in the perforated wall, the openings being periodically closed either by axially displacing a plate to block said openings, or by rotating a subadjacent chamber itself provided with a second series of openings, whereby said first and second series of openings are periodically aligned.

16 Claims, 3 Drawing Figures

APPARATUS FOR REPRODUCING PERFORATED SEAMLESS TUBULAR FILMS BY MEANS OF COMPRESSED AIR

BRIEF DESCRIPTION OF INVENTION

This invention relates to a process for the production, by extruding a synthetic material, preferably a thermoplastic material, of a perforated tubular film without any welded seams by continuously extruding a tubular sheath by means of an extrusion head an pneumatically forming openings or perforations by passing the tubular film over a perforated wall of a chamber connected to a compressed-air source. According to the invention, the process is essentially distinguished by the fact that this chamber is supplied with compressed air at a constant pressure.

By virtue of the fact that said chamber is supplied with compressed air under constant pressure, it is possible to dispense with more or less complex systems between the compressed-air source itself and the pipe through which the extrusion head is supplied with compressed air.

The invention also relates to an arrangement of carrying out the above-mentioned process, distinguished by the fact that the continuous over a surface in which is formed a first series of openings distributed in a circle and which is provided on its lower face with an annular groove into said openings open, and by the fact that this groove is engaged by an annular shoulder of a subjacent chamber which is provided with a second series of openings designed to coincide periodically with the openings of said first series, and which is permanently connected to a source of a pneumatic medium, preferably compressed air, said chamber being rotated, optionally in an oscillating rotary movement.

By virtue of this arrangement, in which the compressed air is permanently supplied under constant pressure, the openings in the continuous tubular film are formed when the two series of openings coincide. The perforations are immediately formed in the tubular film without any delays. The arrangement according to the invention as defined above has a zero response time.

In another embodiment of the invention, the arrangement is distinguished by the fact that the wall with the first series of openings forms part of the chamber connected to the compressed-air source, and by the fact that a plate carrying a solid rib which is designed to engage in said groove to periodically obstruct or gate said first series of openings is axially displaceable in said chamber.

In this embodiment, in which said first series of openings is blocked by the rib formed by an axially displaceable plate, the groove provided in the wall of the chamber, over which the perforated film passes, is not subjected to any wear.

DESCRIPTION OF DRAWINGS

Two embodiments of an arrangement according to the invention are described by way of example in the following with reference to the accompanying drawings wherein.

DETAIL DESCRIPTION OF INVENTION

Figure 1:
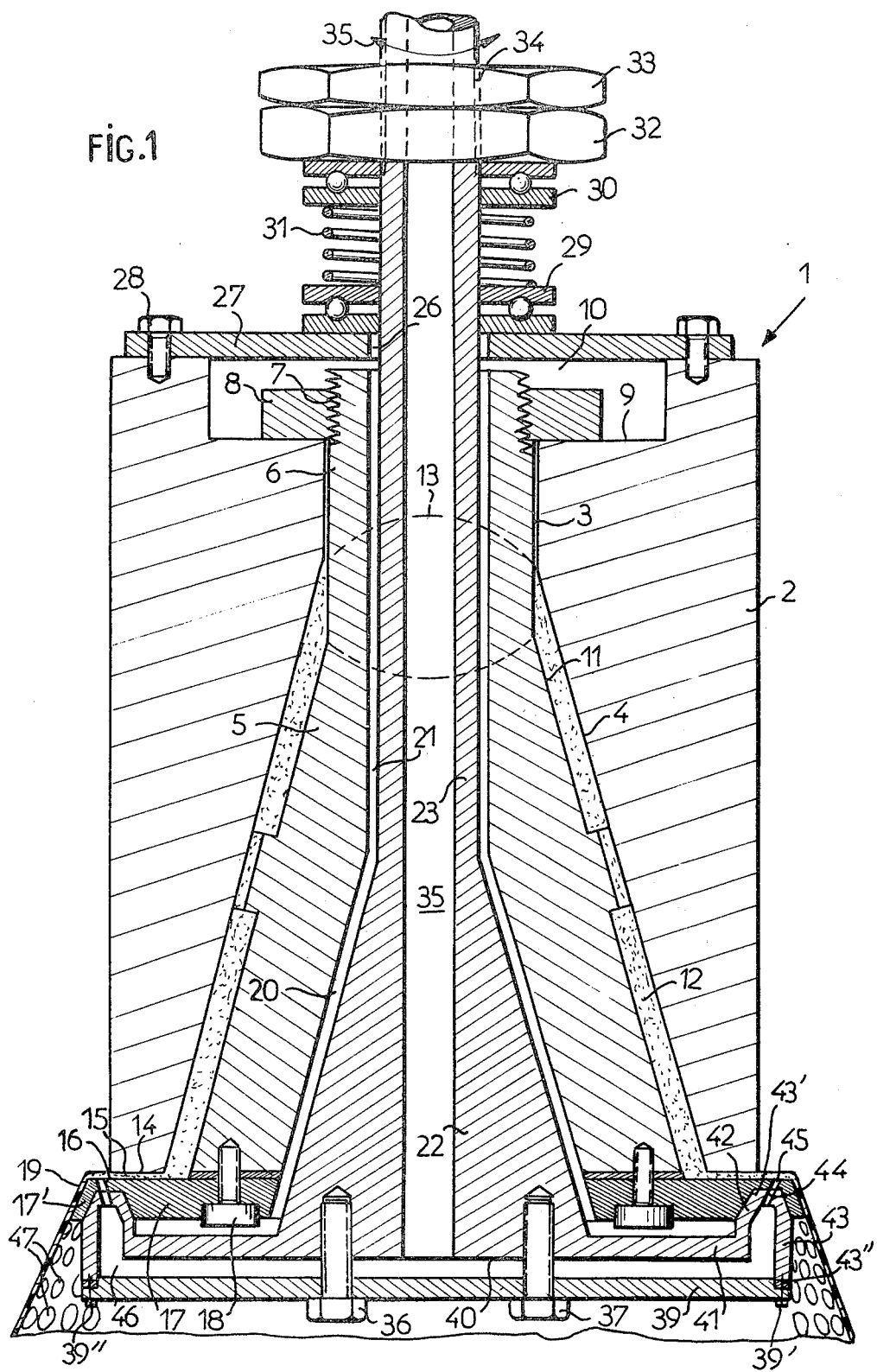
FIG. 1 is a diagrammatic axial section through the first embodiment.

In FIG. 1, the general reference 1 generally denotes the extrusion head which is formed by a block 2 provided with a cylindrical opening 3 in its upper part, followed by a downwardly widening conical bore 4.

A conical intermediate member 5 is mounted in this bore 4, terminating at its upper end in a cylindrical section 6 which extends through the cylindrical opening 3 in the block 2. At its end, the cylindrical section 6 has a screwthread 7 onto which is screwed a nut 8 which rests on the bottom 9 of a recess 10 formed in the upper part of the block 2.

The outer surface 11 of the conical intermediate member 5 is situated at a certain distance from the conical bore 4 of the block 2 so as to form a transfer chamber 12 for the plastics material which passes through an opening 13 designed to communicate with a source supplying a plastics melt, such as for example an extruder (not shown).

The lower front face 14 of the block 2 forms an extrusion slot 15 with the transverse surface upper face 16 of a plate 17 which is fixed by screws 18 to the conical intermediate member 5, the object of the extrusion slot 15 being to form a conical sheet or sheath 19 with the plastics material passing through the chamber 12.

The intermediate member 5 is hollow and is formed in its lower part with a conical bore 20 and in its upper part with a cylindrical bore 21. A central core is accommodated in the cylindroconical passage 20–21 thus formed. This central core is formed by a lower conical section 22 and by an upper cylindrical section 23 which overlaps the intermediate member 5 and which, in addition, extends through an opening 26 formed in a plate 27 screwed by bolts 28 to the upper part of the block 2.

The central core 22–23 is elastically suspended by means of two bearings 29 and 30 between which a helical spring 31 is arranged, and is held in position by means of a nut 32 and a locknut 33 both screwed onto the thread 34.

The central core 22, 23 is formed with an axial passage 35' designed to be coupled to a compressed-air source (not shown).

In addition, the central core is designed to be rotated by suitable means (not shown) which can be means designed to impart to the core an alternate rotary movement in the direction of the double arrow 35.

At its lower end, the conical section 22 of the central core carries, by means of two bolts 36 and 37, a wall 39 situated at a certain distance from its front face 40 which extends peripherally beyond the core 22 to form a plate 41 provided with a peripheral rib 42 extended by a collar 43 extending towards the plate 39, the arrangement being such that a peripheral first series of individual openings 44 is formed in an annular section 43' situated between the rib 42 and the collar 43.

This first series of openings 44 co-operates with openings 45 of a second series of openings formed in the plate 17 whose lower face has a groove covering the upper part of the structure formed by the rib 42 and the collar 43. The plate 39 is fixed to this structure by screws 39', 39'' with a seal 43'' in between.

The arrangement which has just been described functions as follows:

To begin with, the extrusion head is fed with the plastics material which passes through the feed chamber 12 and which is extruded through the die or extrusion slot 15 to form a tubular film or sheath 19.

The compressed air under constant pressure which flows through the bore 35' places the chamber 46 under pressure, and when the central core 22 is rotated in one direction or the other, or alternatively in one direction and the other, of the double arrow 35, perforations 47 are formed in the extruded tubular film every time the first series of openings 44 coincides with the second series of openings 45.

Naturally, the shape of the perforations formed in the tubular film is governed by the shape given to the series of openings 44 and 45 on the one hand and on the other hand by the longitudinal and transverse traction conditions to which the perforated tubular film is exposed as it issues from the extrusion slot, on the one hand through the taper 17' of the plate and on the other hand through the winding traction applied to the perforated sheet in known manner.

The perforated tubular film thus produced is hardened off in known manner by passage through a cold water bath, optionally after having passed through a calibration unit if necessary, and is subsequently wound into rolls.

In one known method, it is also possible to arrange a cutting blade in the path followed by the tubular film. This cutting blade cuts the tubular film along one of its generatrices or in a spiral to obtain a flat perforated film.

Figure 2:
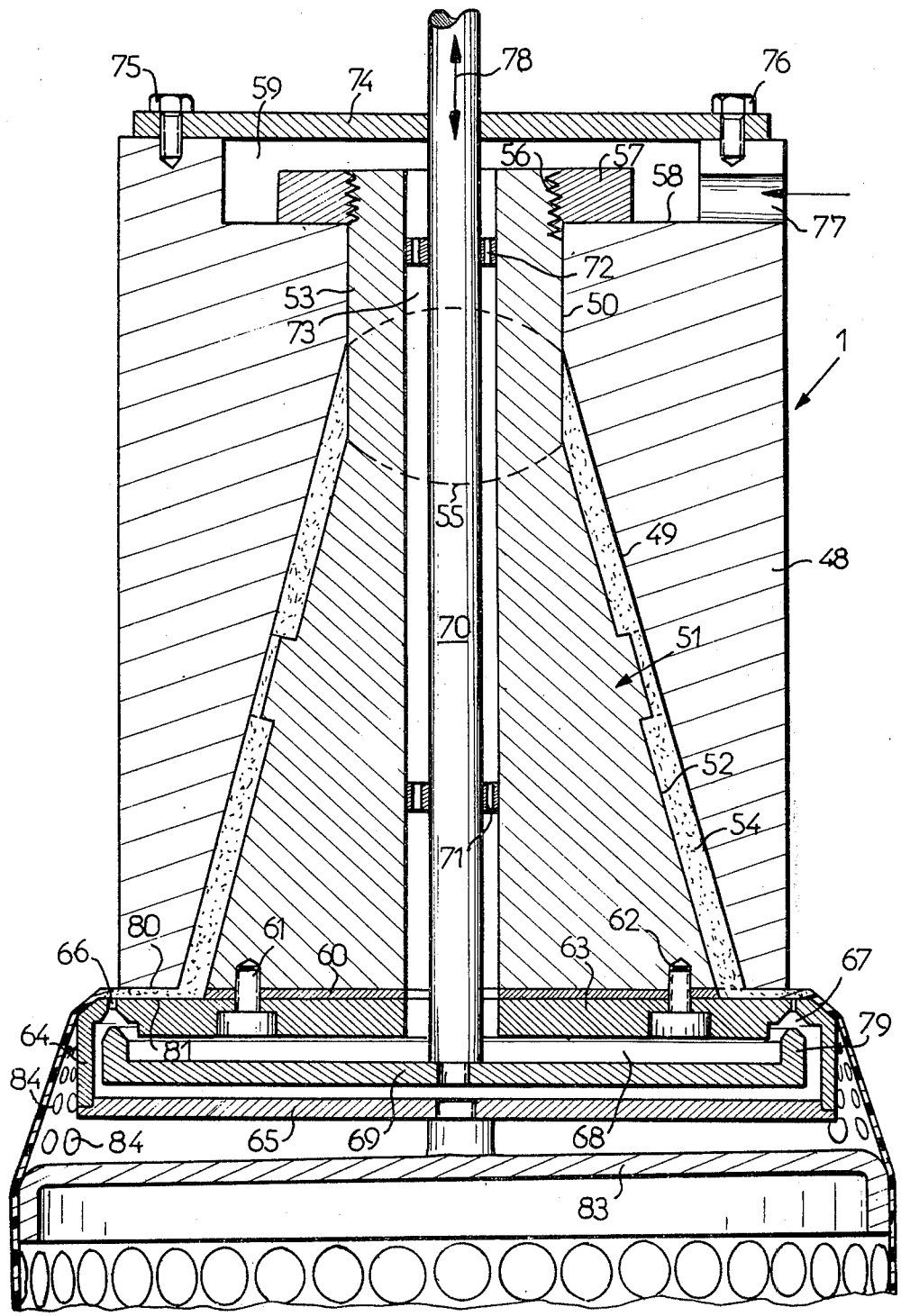
FIG. 2 is an axial section through the second embodiment.

FIG. 2 is a diagrammatic axial section through the second embodiment of an apparatus according to the invention.

The extrusion head, which is again denoted by the general reference 1, is formed by a block 48 provided with a conical bore 49 which terminates in a cylindrical bore 50 at the upper end of the block 48.

A central core designated by the general reference 51 is accommodated in the cylindroconical bore 49, 50. This central core is formed by a lower conical section 52 and an upper cylindrical section 53. The section 53 fits tightly into the cylindrical bore 50 whilst the conical section 52 has a smaller diameter than the bore 49 so that a chamber 54 is left free for passage of the material coming from the extruder through the opening illustrated diagrammatically by the reference 55. At its upper end, the cylindrical section 53 of the central core has a screwthread 56 onto which is screwed a nut 57 which rests on the bottom 58 of a recess 59 formed in the block 48.

A chamber formed by a plate 63 provided with a lateral collar 64, to which a cover 65 is fixed by means (not shown), is fixed by means of screws 61 and 62 to the major base of the conical section 52 with an insert 60 in between. To the right of the block 48, the plate 63 has a series of openings 66 which open downwards into a groove 67.

The chamber 68 houses a plate 69 carried by a shaft 70 guided in bearings 71 and 72 arranged in a bore 73 in the central core 51, said shaft 70 passing freely through a plate 74 screwed by bolts 75 and 76 to the upper front face of the block 48 which is provided with a radial opening 77 communicating freely with the chamber 59 and through the bore 73 with the chamber 68, said radial bore 77 being connected by means (not shown) to the compressed-air source, whilst the shaft 70 is connected to a known device designed to impart to it an alternating axial movement in the direction of the double arrow 78.

The plate 69 comprises a rib 79 designed to engage in the groove 67 so as to periodically gate or obstruct all the openings 66.

The lower front face of the block 48, denoted by the reference 80, forms with the upper face 81 of the plate 60 an extrusion slot for the plastics material passing through the chamber 54.

As it issues from said extrusion slot, the material forms a tubular film which passes over the plate 63.

If the head is connected to a source of compressed air which permanently feeds the chamber 68, and if the shaft 70 is moved alternately in the direction of the double arrow 78, it can be seen that the rib 79 periodically blocks the openings 66, so that between two successive blockings openings such as those denoted by the reference 84 are formed in the tubular film.

The axial interval between the perforations formed in the tubular film is of course governed by the oscillation frequency of the plate 69 and by the rate at which the sheath is extruded.

The tubular film thus formed can pass over a former 83, after which it enters a cooling bath to be treated in known manner.

To facilitate formation of the openings in the extruded tubular film both with the arrangement shown in FIG. 1 and with the arrangement shown in FIG. 2, the compressed air admitted into the extrusion head 1 is preheated to a temperature close to the melting temperature of the plastics material used, preferably to a temperature of around 150°C.

Figure 3:
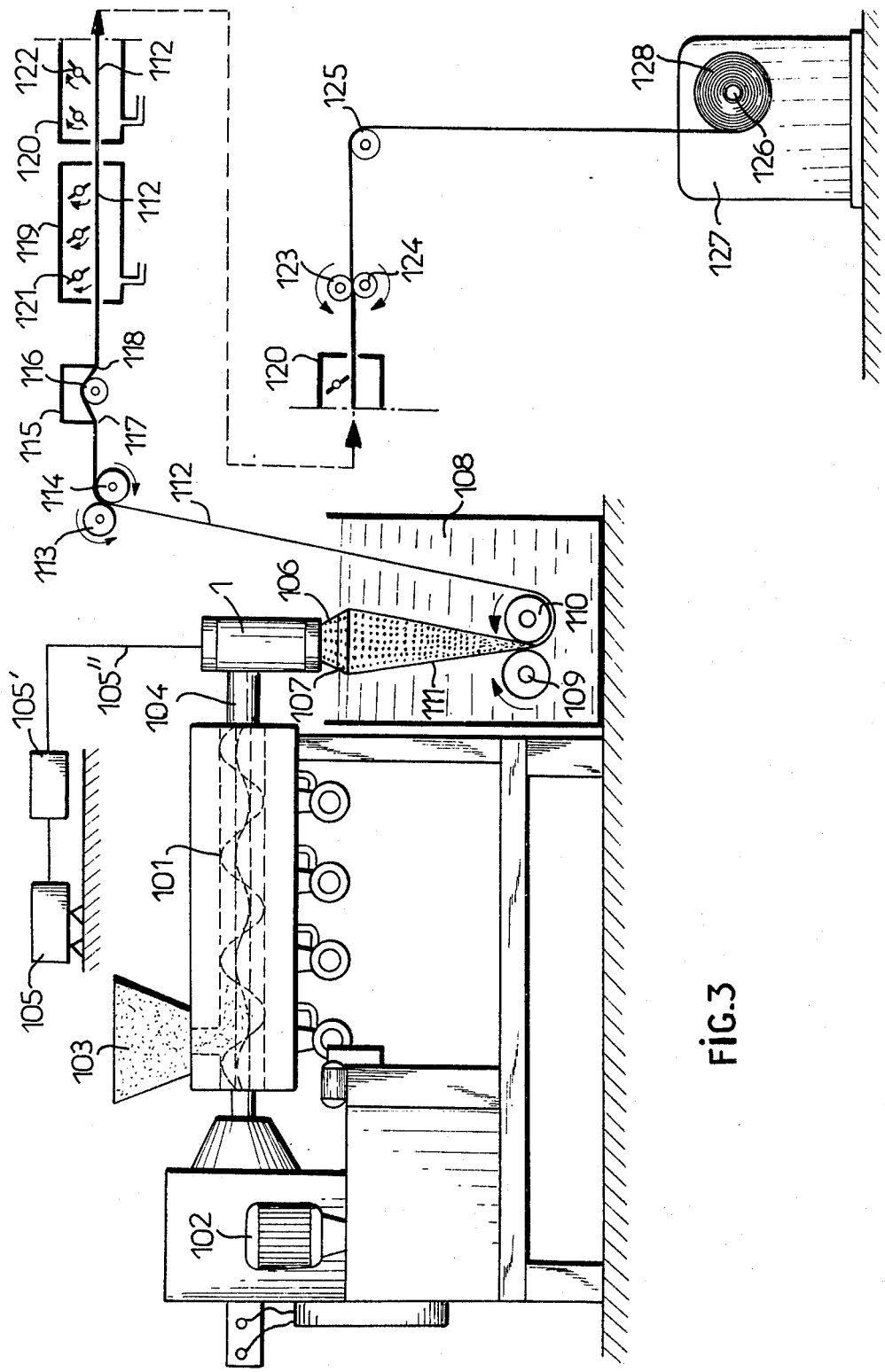
FIG. 3 is a general view of the installation used to manufacture the proposed tubular film.

The general installation for manufacturing the perforated tubular sheath on one or other of the arrangements is shown in FIG. 3.

In FIG. 3, the reference 101 denotes the screw of an extruder which is rotated by the motor 102 and which is used in known manner to plasticise the plastics material introduce into the extruder from a hopper 103. The plastics material is carried by the screw through a channel 104 into the die 1 from which issues the perforated tube which, passing over a former 107, dips into a tank 108 containing cooling water. Above the die 1, the reference 105 denotes a compressor for air heated in the heater 105' and delivered through the pipe 105" either into the bore 35 in FIG. 1 or into the bore 73 in FIG. 2. Two cylinders 109, 110 are mounted in the bottom of the cooling tank, rotating in opposite directions and serving to flatten the tubular sheath 111 which is delivered in the form of a band 112 by the cylinder 110 acting as a delivery cylinder. The band 112 formed by the perforated sheath, which constitutes a seamless tubular film, issues from the tank and passes between two delivery cylinders 113, 114 which rotate in opposite directions and deliver the band through a system for removing from the band any water that may still be adhering to it.

This system is made up of an open box 115 under which the band 112 travels over an idler cylinder 116, rubbing against the edges 17 and 18 of the box 115 as it does so.

It also comprises downstream of the box 115 two boxes 119 and 120 through which the band 112 passes freely and in each of which rotate brushes, such as denoted by the reference 120, which are mounted on shafts such as denoted by the reference 121.

On leaving the drying box 120, the band 112 passes between two cylinders 123, 124 and over a delivery cylinder 125 and is then wound onto the spool 126 of a winding unit 127 where the roll 128 is formed.

The plastics materials to be used are, for example, polyolefins, such as high-density or low-density polyethylenes, polypropylenes, plasticised or non-plasticised PVC, and any mixtures of these materials.

The openings through which passes the constant-pressure compressed air, optionally heated to around 150° C, have a small diameter because it is sufficient to have minimal perforations in the sheath because these perforations are subsequently enlarged in both directions by traction of the sheath both in the longitudinal and in the transverse direction by the former. The number of these holes can vary according to the number of perforations required.

With an arrangement of the kind in FIG. 1 used in an installation of the kind shown in FIG. 3, it was possible to obtain sheaths which, after cooling, have a diameter of from 130 to 190 mm. The diameter of the circle around which the openings 45 are distributed is 80 mm, the plastics material used being low-pressure polyethylene, and the air being compressed to 3–3 bars and heated to around 150° C.

The rotary air distributor was provided with openings 44 whose diameter is at least equal to that of the fixed openings 45. However, tests have shown that better yields can be obtained if the diameter of the openings 44 is equal to 2 or 3 times the diameter of the fixed openings 45.

The number of openings 44 of the distributor may optionally be equal to the number of fixed openings. However, a better yield is obtained if the number of openings 44 of the distributor is smaller than the number of fixed openings 45, for example equal to half the number of fixed openings 45.

With a head in which 110 fixed openings 45 and 55 openings 44 in the distributor were provided, the rotational speed of the distributor was 30 revolutions per minute.

If the rotational speed of the perforating distributor 44 is increased, the extrusion rate and traction rate of the sheath should also be increased, because for one complete revolution of a distributor with 55 openings 44 55 rows of successive openings, situated substantially in planes perpendicular to the axis of the sheath, are formed in the sheath.

We claim:

1. An apparatus for producing perforated seamless tubular film having a source of extruded thermoplastic, full-walled, tubular film and a body having means defining a chamber therein and an external tapered surface exposed to the atmosphere over which said thermoplastic, full-walled tubular film travels longitudinally in direct contact therewith during operation, in a direction of increasing diameter, a transverse surface over which the tubular film travels exposed to the atmosphere transverse to said tapered surface, and a transverse surface merging smoothly with said tapered surface immediately upstream of the tapered surface relative to the longitudinal travel of said tubular film, said transverse surface being provided with a first series of openings distributed in a circle on the periphery of said body and communicating with said chamber in said body, means providing a path to said chamber for communicating with a constant-pressure compressed gaseous fluid source, and means for regularly closing said openings.

2. Apparatus as claimed in claim 1 wherein the first series of openings open into an annular groove on the inner surface of said body, and said groove is engaged by an annular shoulder of a subjacent chamber, said means defining said chamber being rotatable and provided with a second series of openings positionable to coincide periodically with the openings of said first series on rotation of said chamber.

3. Apparatus as claimed in claim 2, wherein both series of openings have equal numbers of openings.

4. Apparatus as claimed in claim 2, wherein said first series of openings has twice as many openings as said second series.

5. Apparatus as claimed in claim 3, wherein the openings of said second series have at least the same diameter as the openings of said first series.

6. Apparatus as claimed in claim 4, wherein the openings of said second series have at least the same diameter as the openings of said first series.

7. Apparatus as claimed in claim 1, wherein said first series of openings are provided in a wall forming part of the chamber connected to the compressed gaseous fluid source, said chamber having an annular groove into which said openings lead, and a plate provided with a solid rib axially displaceable in this chamber, to engage said rib in said groove to periodically block said first series of openings.

8. Apparatus for producing a tube of a plastic material having perforated walls comprising, core means having external perforated walls with openings therein open to the atmosphere, said core means having means therein defining a chamber for receiving a fluid under pressure therein, means defining a flow path into said chamber for connection in operation to a source of fluid under pressure, means for continuously passing in operation a full-walled, thermoplastic tube longitudinally over said perforated walls in contact therewith and open to the atmosphere with said core means disposed internally of said tube, said walls comprising a tapered surface increased in diameter in a direction of travel of the tubular film and a transverse surface transverse to the tapered surface merging smoothly with said tapered surface immediately upstream thereof and over which said tube travels longitudinally open to the atmosphere, and perforation control means operable from externally of said core means for periodically closed and opening said openings to flow said fluid under pressure therethrough to develop perforations through said tube in areas thereof in registry with said openings while said tube is travelling longitudinally.

9. Apparatus for producing a tube of a plastic material having perforated walls according to claim 8, in which said means for passing said full-walled tube of thermoplastic material over said core means comprises extruder means for extruding a seamless tube of thermoplastic material in a plastic state over said perforated walls and close adjacent to said openings.

10. Apparatus for producing a tube of a plastic material having perforated walls according to claim 9, in which said gaseous fluid comprises air.

11. Apparatus for producing a tube of a plastic material having perforated walls according to claim 9, in which said perforation control means comprises wall surfaces on said chamber having openings positionable in registry and out of registry with th first-mentioned openings, and means to rotate said chamber selectively to effect said registry.

12. Apparatus for producing a tube of a plastic material having perforated walls according to claim 9, in which said perforation control means comprises a plate movable to positions for masking and unmasking said openings.

13. Apparatus for producing a tube for a plastic material having perforated walls according to claim 9, in which said openings are arranged in a circle.

14. Apparatus for perforating a tubular film of plastic material before setting thereof comprising, core means inserted in operation into a full-walled tube of thermoplastic film in a plastic state for effecting perforations into said tube of thermoplastic film, said core having a chamber therein for receiving a gaseous fluid therein under pressure, said core means having a diverging surface open to the atmosphere over which said tube of thermoplastic film is advanced in operation longitudinally in contact therewith, and open to the atmosphere, said diverging surface increasing in transverse dimension in the direction of travel of said tube, a transverse surface transverse to the tapered surface merging smoothly with said diverging surface immediately upstream thereof and over which said tube travels longitudinally and open to the atmosphere, said transverse surface having openings therein immediately adjacent an area of merging of the surfaces and in communication with said chamber, means defining a path for providing a gaseous fluid under pressure into said chamber, perforation perforations control means including means operable from externally of said tube for periodically obstructing said openings from internally of core means to flow said fluid under pressure therethrough to develop perforations through said full-walled tube areas in registry with said openings.

15. Apparatus for perforating a tubular film of plastic material before setting thereof according to claim 14, including an extruder means circumferentially of said core means for extruding said full-walled tube of thermoplastic film upstream of and close adjacent to said openings over which said full-walled tube of film advances longitudinally.

16. Apparatus for producing a perforated seamless thermoplastic tubular film comprising, extruder means for extruding during operation a thermoplastic, full-walled, tubular film open to the atmosphere, core means within the extruded full-walled tubular film during operation having walls having perforations open to the atmosphere over which said full-walled tubular film travels longitudinally in direct contact therewith, said walls having surfaces changing the direction of travel longitudinally of said tubular film and including a diverging surface for expanding it during travel thereof, said perforations being disposed immediately upstream of said diverging surface defining flow paths slanted relative to the axis of the tubular film in a direction toward the direction of travel of the tubular films over said walls, perforation control means operable for periodically closing and opening said perforations to flow air under pressure therethrough to develop perforations through said full-walled tube in areas thereof in registry with said perforations while said tube is travelling longitudinally, and means for connecting said core means to a source of air under pressure.

* * * * *